United States Patent
Barsness et al.

(10) Patent No.: US 9,674,230 B1
(45) Date of Patent: Jun. 6, 2017

(54) EXPORT OPERATOR FOR A STREAMING APPLICATION THAT EXPORTS FROM MULTIPLE OPERATORS ON MULTIPLE PARALLEL CONNECTIONS

(71) Applicant: International Business Machines Corporation, Armonk, NY (US)

(72) Inventors: Eric L. Barsness, Pine Island, MN (US); Michael J. Branson, Rochester, MN (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/051,301

(22) Filed: Feb. 23, 2016

(51) Int. Cl.
*G06F 15/16* (2006.01)
*H04L 29/06* (2006.01)
*H04L 12/709* (2013.01)
*H04L 12/26* (2006.01)

(52) U.S. Cl.
CPC ...... *H04L 65/1013* (2013.01); *H04L 43/0835* (2013.01); *H04L 45/245* (2013.01); *H04L 65/60* (2013.01)

(58) Field of Classification Search
CPC ...... G06F 9/5066; G06F 9/46; G06F 17/2258; G06F 17/30516; G06F 17/30569; G06F 17/30539; G06F 11/3048; G06F 17/30525; H04L 65/60
USPC ........ 707/682, 736, 774, 769, 737; 718/107; 709/227, 231
See application file for complete search history.

(56) References Cited

U.S. PATENT DOCUMENTS

| | | | | |
|---|---|---|---|---|
| 6,801,938 B1 * | 10/2004 | Bookman | ........... | G06F 17/2258 707/999.201 |
| 8,260,803 B2 * | 9/2012 | Hsu | ................... | G06F 17/30516 707/769 |
| 8,954,599 B2 | 2/2015 | Chang | | |
| 9,298,788 B1 * | 3/2016 | Kekre | ............... | G06F 17/30569 707/682 |
| 2008/0235685 A1 | 9/2008 | Amini et al. | | |
| 2010/0293535 A1 | 11/2010 | Andrade et al. | | |
| 2011/0213802 A1 * | 9/2011 | Singh | ................ | G06F 17/30539 707/774 |
| 2011/0314019 A1 * | 12/2011 | Jimenez Peris | ....... | G06F 9/5066 707/737 |

(Continued)

OTHER PUBLICATIONS

De Bruijn et al., Application-Tailored I/O with Streamline, ACM Trans. Comput. Syst. vol. 29, No. 2, May 2011.

(Continued)

*Primary Examiner* — Dustin Nguyen
(74) *Attorney, Agent, or Firm* — Martin & Associates, LLC; Derek P. Martin

(57) ABSTRACT

An export operator includes multiple parallel connections that service a group of operators in a streaming application, and outputs data on the multiple parallel connections to an import operator. Each data tuple output by the export operator includes an identification of which operator sent the data tuple to the export operator, and may also include an identification of missing data, if any. Providing an export operator with multiple parallel connections that can service a group of operators in parallel reduces the likelihood of having an export operator become a bottleneck to system performance.

20 Claims, 6 Drawing Sheets

(56) References Cited

U.S. PATENT DOCUMENTS

| | | |
|---|---|---|
| 2012/0259910 A1 | 10/2012 | Andrade et al. |
| 2013/0166620 A1 | 6/2013 | Branson et al. |
| 2013/0290969 A1 | 10/2013 | Branson et al. |
| 2014/0040915 A1* | 2/2014 | Chen .................. G06F 9/46 |
| | | 718/107 |
| 2014/0089373 A1 | 3/2014 | Branson et al. |
| 2014/0164628 A1* | 6/2014 | Branson .............. G06F 11/3048 |
| | | 709/227 |
| 2014/0379712 A1* | 12/2014 | Lafuente Alvarez ............ G06F 17/30516 |
| | | 707/736 |
| 2015/0161289 A1 | 6/2015 | Branson et al. |
| 2016/0364451 A1* | 12/2016 | Barsness ........... G06F 17/30525 |
| 2016/0366201 A1* | 12/2016 | Barsness ............... H04L 65/608 |

OTHER PUBLICATIONS

IBM, Static and dynamic stream connections in SPL, printed from https://www-01.ibm.com/support/knowledgecenter/SSCRJU_4.0.1/com.ibm.streams.dev.doc/doc/staticanddynamicstream.html on Feb. 5, 2016.

IBM, Export Operator, IBM InfoSphere Streams Version, printed from https://www-01.ibm.com/support/knowledgecenter/SSCRJU_4.0.1/com.ibm.streams.ref.doc/doc/export.html?lang=en on Feb. 8, 2016.

* cited by examiner

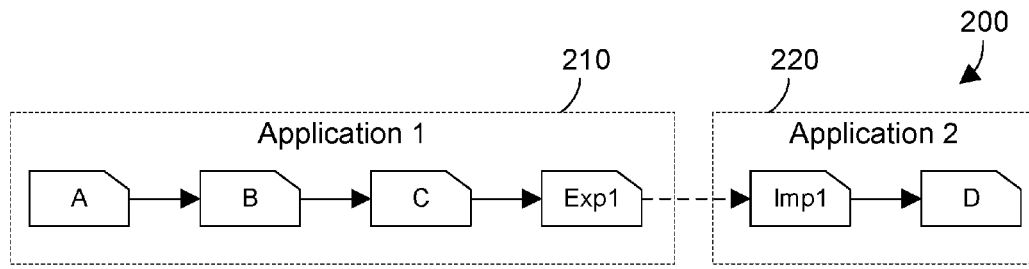
FIG. 2
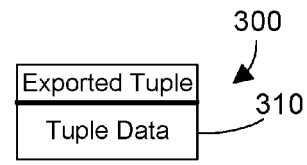
FIG. 3
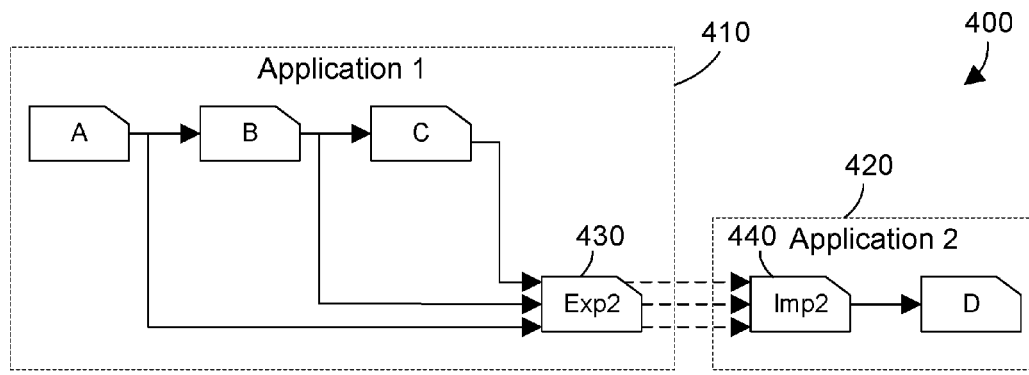
FIG. 4
| Operator Group | Priority Type | Missing Data | Maximum Exports |
|---|---|---|---|
| C, B, A | Prioritized List | C – None<br>B – Addr<br>A – SSN, Addr | C – 20<br>B – 10<br>A – 10 |
FIG. 5

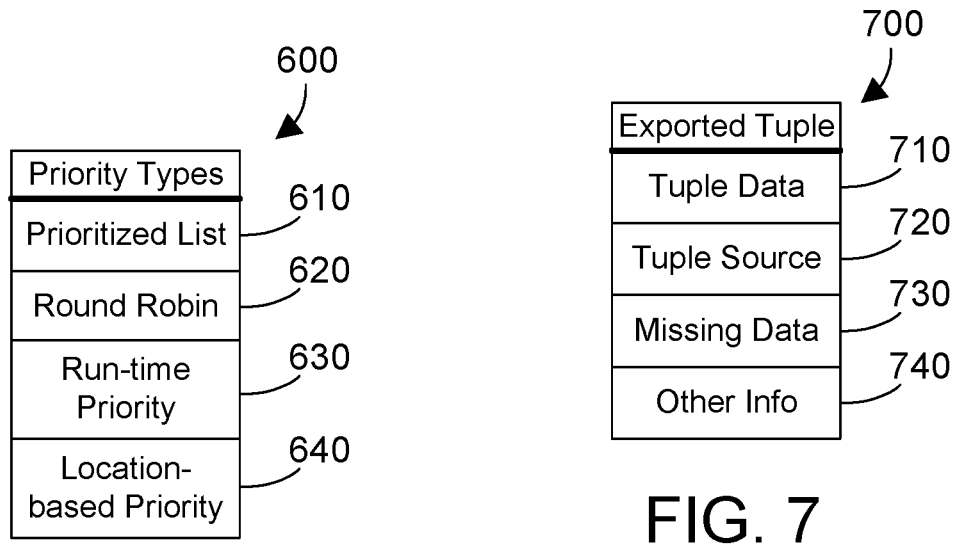
FIG. 6
FIG. 7
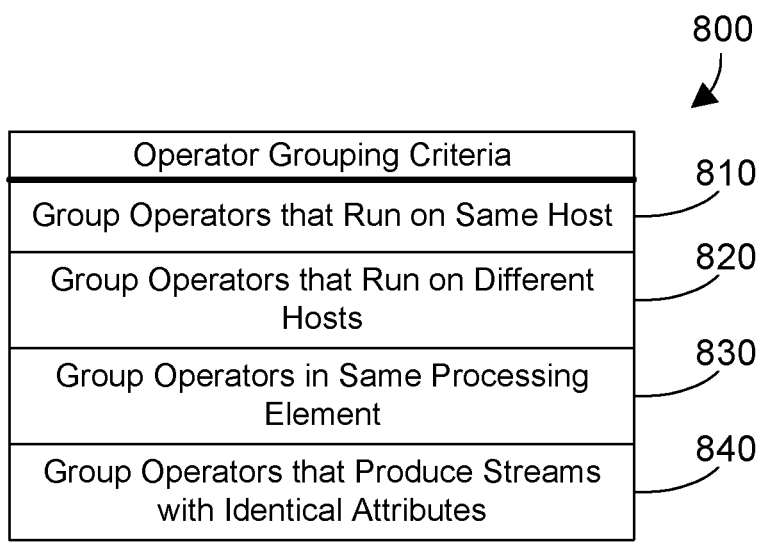
FIG. 8

EXPORT OPERATOR FOR A STREAMING APPLICATION THAT EXPORTS FROM MULTIPLE OPERATORS ON MULTIPLE PARALLEL CONNECTIONS

BACKGROUND

1. Technical Field

This disclosure generally relates to streaming applications, and more specifically relates to exporting data in a streaming application.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next operator. Streaming applications are becoming more common due to the high performance that can be achieved from near real-time processing of streaming data.

Known streaming applications may include one or more export operators that can export data tuples to other streaming applications. Export operators allow other operators to dynamically connect at run-time. Known export operators include an input port that receives data tuples from one or more operators, and provides a single connection for streaming data to one or more import operators. When many import operators need to import data tuples from the same operator, the single connection in an export operator can become a bottleneck in the streaming application.

BRIEF SUMMARY

An export operator includes multiple parallel connections that service a group of operators in a streaming application, and outputs data on the multiple parallel connections to an import operator. Each data tuple output by the export operator includes an identification of which operator sent the data tuple to the export operator, and may also include an identification of missing data, if any. Providing an export operator with multiple parallel connections that can service a group of operators in parallel reduces the likelihood of having an export operator become a bottleneck to system performance.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a block diagram showing a sample export operator in one application that exports data to an import operator in another application using a single connection between the export operator and the import operator;

FIG. 3 is a block diagram showing the contents of an exported tuple that is exported by the export operator in FIG. 2;

FIG. 4 is a block diagram of an application similar to the application shown in FIG. 2 but using an export operator that has multiple parallel connections for exporting data from a group of multiple operators to an import operator;

FIG. 5 is a table showing configuration information for the multiple connection export operator in FIG. 4;

FIG. 6 is a table showing priority types for the multiple connection export operator in FIG. 4;

FIG. 7 is a block diagram showing the contents of an exported tuple that is exported by the multiple connection export operator in FIG. 4;

FIG. 8 is a table showing examples of operator grouping criteria;

DETAILED DESCRIPTION

The disclosure and claims herein are directed to an export operator that includes multiple parallel connections that service a group of operators in a streaming application, and outputs data on the multiple parallel connections to an import operator. Each data tuple output by the export operator includes an identification of which operator sent the data tuple to the export operator, and may also include an identification of missing data, if any. Providing an export operator with multiple parallel connections that can service a group of operators in parallel reduces the likelihood of having an export operator become a bottleneck to system performance.

Figure 1:
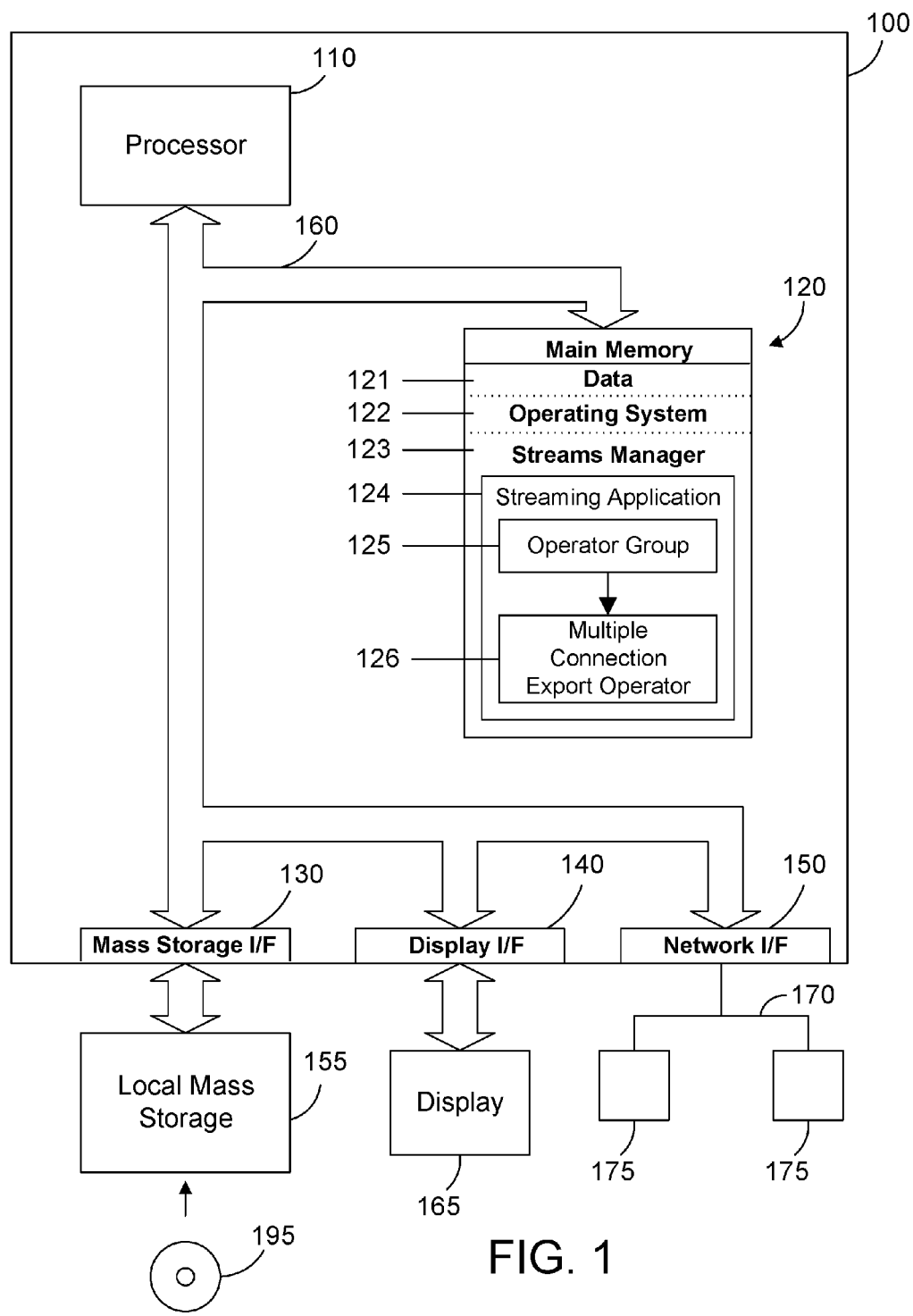
FIG. 1 is a block diagram of a computer system that includes a multiple connection export operator that exports data from multiple operators on multiple parallel connections.

Referring to FIG. 1, a computer system 100 is one suitable implementation of a server computer system that includes a multiple connection export operator as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a runtime environment that executes a streaming application 124. The streaming application 124 comprises a flow graph that includes processing elements that include operators that process data tuples. The streaming application 124 supports grouping operators into an operator group 125, and defining a multiple connection export operator 126 that can export tuples from any or all of the operators in the operator group 125 in parallel, as discussed in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, which includes the multiple connection export operator 126.

Although computer system 100 is shown to contain only a single processor and a single system bus, those skilled in the art will appreciate that a multiple connection export operator in a streaming application as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 2, an extremely simplified streaming environment 200 is shown that includes a first application 210 and a second application 220. The first application 210 includes three operators A, B and C. Operator A produces tuples that are sent to operator B. Operator B performs some operation on the tuples and passes them on to operator C. Operator C sends its tuples to an export operator Exp1. Export operators are known in the art of streaming applications. Known export operators include a single connection to an operator. Thus, as shown in FIG. 2, export operator Exp1 has a single connection, which allows the export operator Exp1 to export tuples received from operator C to other applications that have import operators connected to the single connection in the export operator Exp1. Thus, in the example shown in FIG. 2, the second application 220 includes an import operator Imp1 that is dynamically connected to the single connection in the export operator Exp1 in the first application 210, which allows communicating tuples between these two applications on the single connection. The tuples input by the import operator Imp1 are then sent to Operator D for processing.

FIG. 3 shows an exported tuple 300, which includes tuple data 310. Note the export operator Exp1 does not add any information to the tuple data 310 received from operator C. The export operator Exp1 is simply a mechanism for exporting the data to import operators in other applications by defining a single connection between the export operator and an import operator.

A potential problem with the configuration shown in FIG. 2 is the export operator has a single connection that receives tuples from operator C. If many applications have import operators that need to receive tuples from operator C, the export operator can become a bottleneck and may not be able to keep up with demand. In some cases, data from earlier operators could be used as long as there is an understanding that some data may be missing or some attributes potentially changed. Referring to FIG. 4, let's assume an application 410 processes streaming data relating to people. Operator A outputs a tuple that includes the name of a person to Operator B, which adds the Social Security Number (SSN) of the person, and outputs a tuple that includes the name and SSN to Operator C, which adds an address for the person, and outputs a tuple that includes the name, SSN and address for the person. The export operator 430 shown in FIG. 4 is an example of a multiple connection export operator, meaning the export operator 430 in FIG. 4 can receive tuples from all three operators A, B and C, as indicated by the three inputs to the export operator 430 in FIG. 4, and can output tuples on these three parallel connections to an import operator, as shown by the three arrows between export operator 430 and import operator 440 in FIG. 4. The export operator can choose which tuples to export on which connection when an import operator such as import operator 440 in the second application 420 requests data from the export operator 430. In the specific example in FIG. 4, operators A, B and C correspond to the operator group 125 in FIG. 1, and export operator 430 corresponds to the multiple connection export operator 126 in FIG. 1.

The multiple connection export operator functions according to defined parameters. FIG. 5 shows a table 500 with examples of parameters that could determine the function of a multiple connection export operator. The operator group specifies a group of operators that can send tuples to the export operator, and for which the export operator provides a parallel connection. The operator group is C, B and A, because all three operators C, B and A in FIG. 4 can send tuples to the export operator 430. The priority type is listed as a "prioritized list", meaning the order of operators in the operator group dictates the prioritized preference for exporting tuples. Because operator C is listed first, the export operator 430 will always output tuples from operator C as long as they are available from operator C and operator C is not too slow in providing the tuples due to congestion. When tuples are not available from operator C or operator C is too slow in providing the tuples, the export operator 430 can go to the next operator in the prioritized list, namely operator B, and can output tuples from Operator B when tuples from Operator C are not available due to a failure in Operator C, or Operator C is too slow in providing the tuples due to congestion. When tuples are not available from either operator C or operator B or they are too slow in providing the tuples, the export operator 430 can output tuples from operator A. Note the tuples from operators A, B and C pass through the export operator on parallel connections, one connection for each operator. Because tuples from operators A and B do not have all the data that is in the tuples from operator C, there is a need to indicate what data is missing. The Missing Data column in FIG. 5 indicates that tuples from operator C have no missing data. Tuples from operator B do not have the address data. Tuples from operator A do not have the SSN and address data. By correlating missing data to the multiple operators serviced by the multiple connection export operator, the export operator has the intelligence to indicate when exporting tuples which data is missing in the tuples. A Maximum Connections column in table 500 in FIG. 5 shows the maximum number of connections that could be made by import operators. Operator C is shown with a maximum of 20 connections, with operator B having a maximum of 10 connections and operator A having a maximum of 10 connections. The maximum exports number in FIG. 5 allows refusing additional connections to import operators that request tuples from these three operators. Note the parameters shown in FIG. 5 could reside in the streams manager, or could reside in the multiple connection export operator.

In the example table 500 in FIG. 5, a prioritized list is shown in the Priority Type column. FIG. 6 shows four priority types, which include the prioritized list 610 discussed above with respect to FIG. 5, Round Robin 620, Run-time Priority 630, and Location-based priority 640. With Round Robin priority 620, the export operator receives tuples from the operators in the group in a round robin fashion. Thus, for the simple example in FIG. 4, if the export operator 430 had a round robin priority type with three parallel connections that service the three operators A, B and C, this means a first tuple sent by the multiple connection export operator 430 is from operator A on a first connection; the next tuple sent by the export operator 430 is from operator B on a second connection; the next tuple sent by the export operator 430 would be from operator C on a third connection; the next tuple sent by the export operator 430 would be from operator A on the first connection, and so on, in round robin fashion. With Run-time Priority 630, a decision is made at run-time that provides the prioritization of operators. For example, a decision could be made at run-time to make one operator the highest priority based on the data it is producing. Run-time Priority expressly extends to the ability to prioritized operators at run-time using any suitable criteria, algorithm or heuristic. Location-based priority 640 is one specific example of Run-time Priority 630. Location-based priority 640 means priority of operators can be assigned based on their location relative to the export operator. A simple example will illustrate. Let's assume operator A is on a different virtual machine (VM) on the same host computer system as the export operator; operator B is on the same VM on the same host computer system as the export operator; and operator C is on a VM on a different host computer system than the export operator. Priority can then be assigned based on location of the operators relative to the export operator. Thus, for this example above, the priority would be B-A-C, because B is the closest to the export operator (on the same VM) and C is the farthest from the export operator (on a different physical host), with A being in between the two (different VM, same physical host). The types of priority shown in FIG. 6 are shown by way of example, and are not limiting. The disclosure and claims herein expressly extend to any suitable priority type for a multiple connection export operator to determine priority of operators sending data on its multiple connections.

Tuples exported from the multiple connection export operator necessarily include additional data besides the tuple data. Thus, as shown in FIG. 7, exported tuple 700 includes the tuple data 710 received from an operator, but additionally includes a tuple source 720 that specifies which operator was the source of the tuple, and missing data 730 that indicates if there is any missing data in the tuple. The exported tuple 700 may optionally include other information 740, such as the reason (e.g., congestion or failure) the tuple is not coming from the preferred operator. For example, a tuple exported from Operator A in FIG. 4 includes the tuple data 710 from Operator A, specifies Operator A as the tuple source 720, specifies the SSN and Addr are missing data in the tuple 730, and may optionally specify that operator C failed and operator B was congested 740. By specifying the missing data, the import operator knows either to ignore the missing data, or to fill the fields of missing data with a default or null data value, so the operator receiving the imported tuple does not mistake the tuple as having data it does not have.

The operators in a streaming application can be grouped according to any suitable operator grouping criteria. Examples of suitable operator grouping criteria 800 are shown in FIG. 8 to include: group operators that run on the same host computer system 810; group operators that run on different host computer systems 820; group operators in the same processing element 830; and group operators that produce streams with identical attributes 840. Of course, other grouping criteria could also be used within the scope of the disclosure and claims herein.

Figure 9:
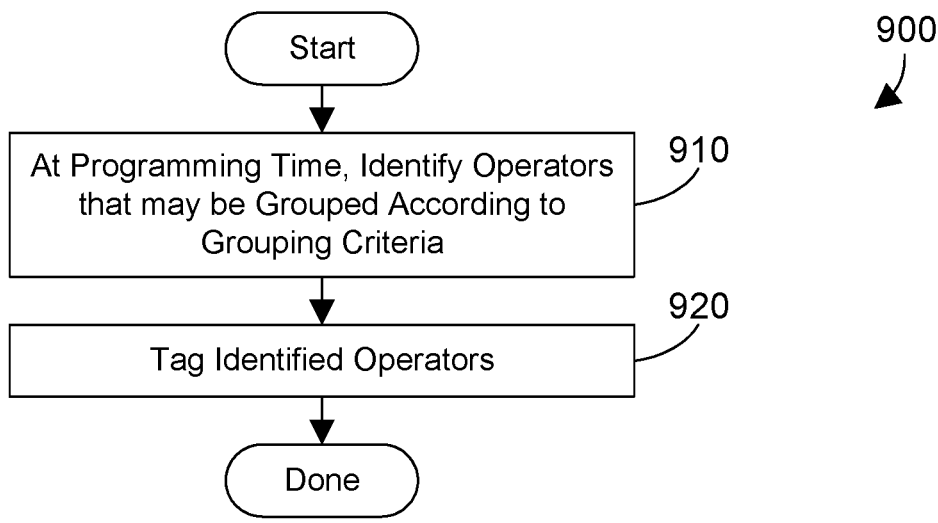
FIG. 9 is a flow diagram of a method for programmatically tagging operators at programming time to support grouping the operators at run-time.
Figure 10:
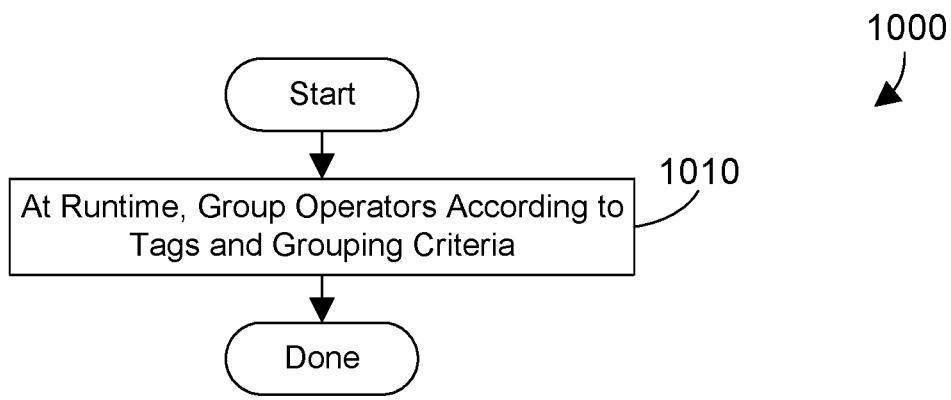
FIG. 10 is a flow diagram showing the grouping of operators at run-time according to the programmatic tags referenced in FIG. 9.

The grouping of operators can be done at runtime in two ways. The first is for a programmer to tag operators at programming time, as shown in FIG. 9. In method 900, at programming time, the programmer identifies operators that may be grouped according to any suitable grouping criteria (step 910), such as grouping criteria shown in FIG. 8, or based on the programmer's selection of operators to be grouped. The identified operators are tagged (step 920) with attributes that give information to the streams manager regarding suggested, allowed or required grouping of operators. Then at runtime, as shown by method 1000 in FIG. 10, the streams manager can use the tags in operators to determine how to group operators for a multiple connection export operator according to the tags and specified grouping criteria (step 1010).

Figure 11:
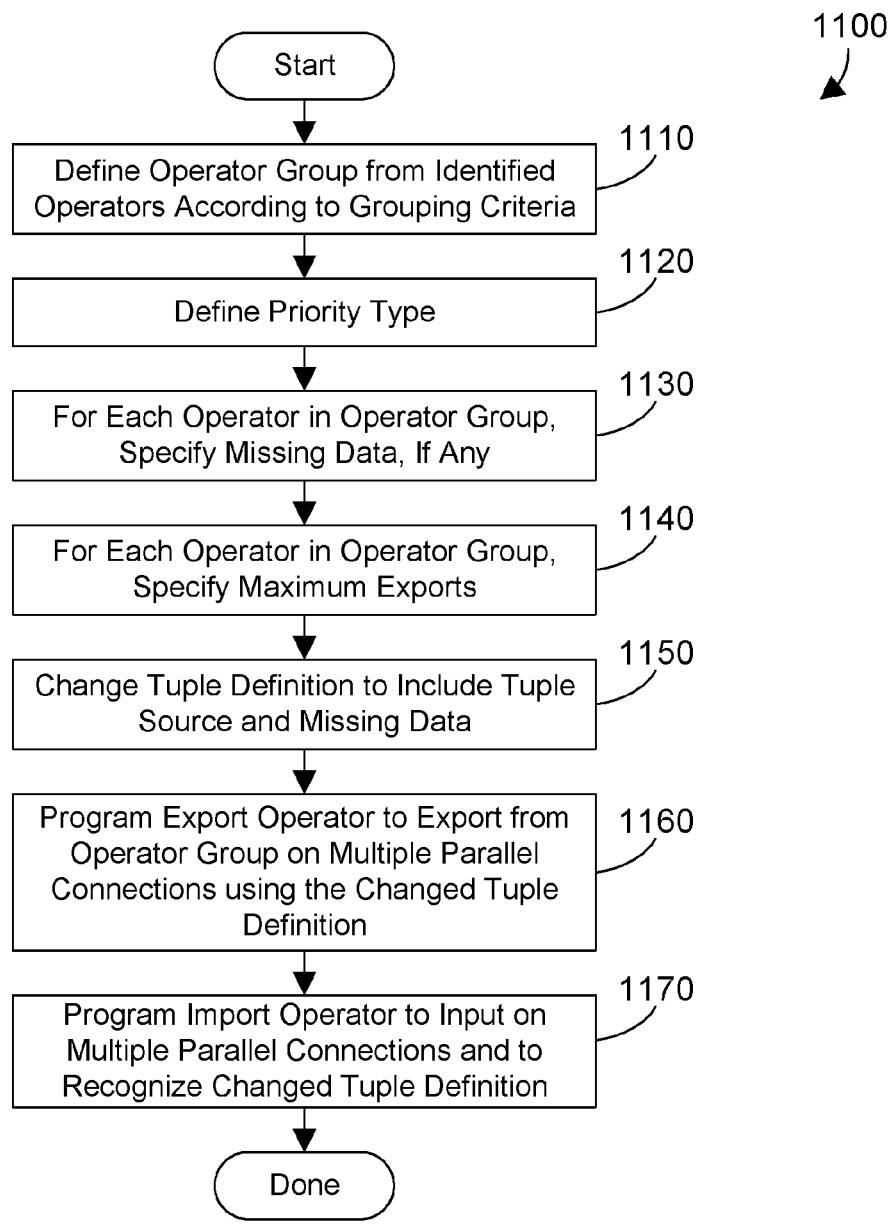
FIG. 11 is a flow diagram of a method for exporting data from multiple operators using a multiple connection export operator.

Tagging operators programmatically at programming time as discussed above with reference to FIGS. 9 and 10 is one way to group operators. In an alternative implementation, all of the grouping can be done at run-time without any preparatory work during programming time. Referring to FIG. 11, a method 1100 represents steps for creating and using a multiple connection export operator. An operator group is defined from identified operators according to a suitable grouping criteria (step 1110). Examples of suitable grouping criteria are shown in FIG. 8 and are discussed above. Of course, other grouping criteria could also be used, such as a manual selection of a group of operators by a user. The priority type is defined (step 1120). Suitable examples of priority type are shown in FIG. 6 and are discussed above. Of course, other priority types are also possible. For each operator in the operator group, any missing data is specified (step 1130). Examples of specifying missing data are shown in FIG. 5 and are discussed above. For each operator in the operator group, specify a maximum number of connections (step 1140). Maximum exports are shown in FIG. 5 and are discussed above. Note that step 1140 is optional, and need not necessarily be performed. The tuple definition is changed to include the tuple source and missing data (step 1150). An example of the changed tuple definition is shown in FIG. 7. The multiple connection export operator is then programmed to export from the operator group on multiple parallel connections using the changed tuple definition (step 1160). The import operator is also programmed to input data on multiple parallel connections and to recognize the changed tuple definition (step 1170) so the import operator can identify the source of the tuple and any missing data. Method 1100 is then done.

Figure 12:
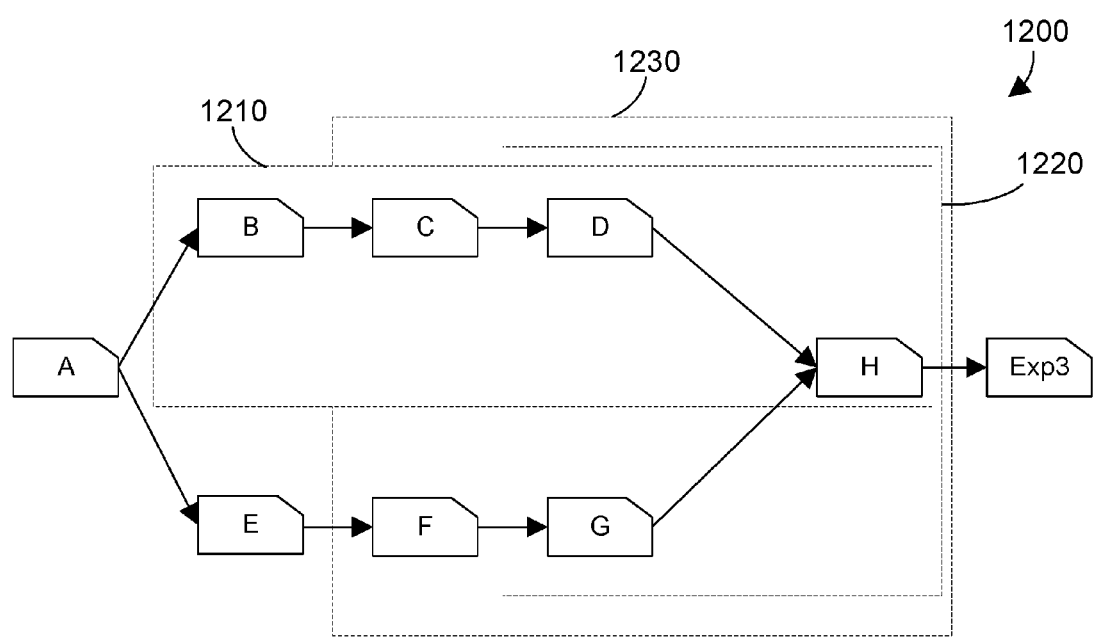
FIG. 12 is a block diagram showing a flow graph that illustrates different possible groupings of operators for the multiple connection export operator.

A simple example is provided in FIG. 4 that shows the grouping of operators A, B and C to export operator 430, which provides three parallel connections for these three operators to an import operator. This is a very simplified example presented for the purpose of illustration. Various other types of groupings could be made. For example, FIG. 12 shows a sample flow graph that includes operators A, B, C, D, E, F, G, H and a multiple connection export operator Exp3. A first grouping of operators 1210 includes operators B, C, D and H, which means export operator Exp3 has four connections for each of these four grouped operators. A second grouping of operators 1220 includes operators D, G and H, which means export operator Exp3 has three connections for these three grouped operators. A third grouping of operators 1230 includes operators C, D, F, G and H, which means export operator Exp3 has five connections for these five grouped operators. Note the multiple connections for the export operator Exp3 are not shown in FIG. 12 for the sake of simplifying the drawing, but it is understood the export operator Exp3 will have a number of connections that is needed for the number of operators in the group.

The example shown in FIG. 12 and discussed above assumes there is a separate parallel channel in the export operator for each operator that sends data to the export operator. However, this is not a requirement. The prior art has a single connection in an export operator that provides a single data stream to one or more import operators. The disclosure and claims herein expressly extend to an export operator with multiple connections that provide multiple data streams in parallel to one or more import operators. In one implementation, there may be a one-to-one correspondence between operators served by an export operator and parallel connections in the export operator, as described above with respect to FIGS. 4 and 12. In an alternative implementation, there may be fewer connections in the export operator than operators connected to the export operator. Thus, for grouping 1210 in FIG. 12, an export operator could have two connections, with operators B and D being served by the first connection and operators C and H being served by the second connection. The disclosure and claims herein extend to any export operator that includes multiple parallel connections.

An export operator includes multiple parallel connections that service a group of operators in a streaming application, and outputs data on the multiple parallel connections to an import operator. Each data tuple output by the export operator includes an identification of which operator sent the data tuple to the export operator, and may also include an identification of missing data, if any. Providing an export operator with multiple parallel connections that can service a group of operators in parallel reduces the likelihood of having an export operator become a bottleneck to system performance.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a first streaming application residing in the memory and executed by the at least one processor, the first streaming application comprising a first flow graph that includes a first plurality of operators that process a first plurality of data tuples, wherein the first plurality of operators comprises an export operator comprising a plurality of parallel connections that receive data tuples from a first group of the first plurality of operators; and
   a second streaming application residing in the memory and executed by the at least one processor, the second streaming application comprising a second flow graph that includes a second plurality of operators that process a second plurality of data tuples, wherein the second plurality of operators comprises an import operator that receives data tuples from the plurality of parallel connections in the export operator in the first streaming application.

2. The apparatus of claim 1 wherein the first and second streaming applications are executed under control of a streams manager.

3. The apparatus of claim 2 wherein the export operator is configured by the streams manager to receive data tuples from the first group of the first plurality of operators.

4. The apparatus of claim 2 wherein the streams manager creates the first group of the first plurality of operators according to programmatic tags in the first group of the first plurality of operators.

5. The apparatus of claim 2 wherein the streams manager creates the first group of the first plurality of operators based upon input from a user.

6. The apparatus of claim 2 wherein the streams manager creates the first group of the first plurality of operators according to at least one operator grouping criterion that specifies at least one of:
   group operators that run on a same host computer system;
   group operators that run on different host computer systems;
   group operators in a same processing element in the first streaming application; and group operators that produce streams with identical attributes.

7. The apparatus of claim 1 wherein each data tuple output by the export operator includes an identification of which operator in the first group of the first plurality of operators sent the data tuple to the export operator.

8. The apparatus of claim 1 wherein each data tuple output by the export operator includes an identification of missing data, if any.

9. The apparatus of claim 1 wherein the export operator outputs tuples on the plurality of parallel connections according to a specified priority for each operator in the first group.

10. A computer-implemented method executed by at least one processor for executing streaming applications, the method comprising:
    executing a first streaming application comprising a first flow graph that includes a first plurality of operators that process a first plurality of data tuples, wherein the first plurality of operators comprises an export operator comprising a plurality of parallel connections that receive data tuples from a first group of the first plurality of operators; and
    exporting the first plurality of data tuples on the plurality of parallel connections in the export operator to at least one import operator in a second streaming application.

11. The method of claim 10 wherein the first and second streaming applications are executed under control of a streams manager.

12. The method of claim 11 further comprising the streams manager configuring the export operator to receive data tuples from the first group of the first plurality of operators.

13. The method of claim 11 further comprising the streams manager creating the first group of the first plurality of operators according to programmatic tags in the first group of the first plurality of operators.

14. The method of claim 11 further comprising the streams manager creating the first group of the first plurality of operators based upon input from a user.

15. The method of claim 11 further comprising the streams manager creating the first group of the first plurality of operators according to at least one operator grouping criterion that specifies at least one of:
    group operators that run on a same host computer system;
    group operators that run on different host computer systems;
    group operators in a same processing element in the first streaming application; and
    group operators that produce streams with identical attributes.

16. The method of claim 10 wherein each data tuple output by the export operator includes an identification of which operator in the first group of the first plurality of operators sent the data tuple to the export operator.

17. The method of claim 10 wherein each data tuple output by the export operator includes an identification of missing data, if any.

18. The method of claim 10 further comprising specifying priority of each operator in the first group, wherein the export operator outputs tuples on the plurality of parallel connections according to the specified priority.

19. A computer-implemented method executed by at least one processor for executing streaming applications, the method comprising:
    executing a streams manager;
    the streams manager executing a first streaming application comprising a first flow graph that includes a first plurality of operators that process a first plurality of data tuples;
    the streams manager creating a first group of the first plurality of operators based upon input from a user and at least one operator grouping criterion that specifies at least one of:
        group operators that run on a same host computer system;
        group operators that run on different host computer systems;
        group operators in a same processing element in the first streaming application; and
        group operators that produce streams with identical attributes;
    the streams manager creating an export operator comprising a plurality of parallel connections, each of the plurality of parallel connections receiving data tuples from a different operator in the first group of the first plurality of operators;
    and
    exporting the first plurality of data tuples from the plurality of parallel connections in the export operator to at least one import operator in a second streaming application, wherein each data tuple output by the export operator includes an identification of which operator in the first group of the first plurality of operators sent the data tuple to the export operator and an identification of missing data, if any.

20. The method of claim 19 further comprising programming the input operator to recognize the plurality of parallel connections in the export operator and to recognize data tuples output by the export operator.

* * * * *